United States Patent [19]
Denber

[11] Patent Number: 5,193,523
[45] Date of Patent: Mar. 16, 1993

[54] HEATED WORKSTATION

[75] Inventor: Michel J. Denber, Rochester, N.Y.

[73] Assignee: Xerox Corporation, Stamford, Conn.

[21] Appl. No.: 719,411

[22] Filed: Jun. 24, 1991

[51] Int. Cl.$^5$ .............................................. F24F 12/00
[52] U.S. Cl. ...................................... 126/204; 165/47;
165/80.3; 454/184; 454/370
[58] Field of Search ................. 126/204; 165/80.3, 47;
361/384; 454/184, 306, 338, 370, 903; 34/202, 343

[56] References Cited

U.S. PATENT DOCUMENTS 1,194,527  8/1916  McNamara ..................... 454/306 X
4,351,475  9/1982  Hudson ........................... 454/338 X

FOREIGN PATENT DOCUMENTS 11535    1/1986  Japan ..................................... 454/306
83996    3/1990  Japan ..................................... 361/384
105497   4/1990  Japan ..................................... 361/384

Primary Examiner—Harold Joyce

[57] ABSTRACT

A data processing workstation environment is rendered more comfortable for an operator by adapting the system to permit heated, vented air from the interior of the computer to be directed into a conduit coupling which terminates in a selected area of the workstation. In one embodiment, the heated air is introduced into the interior of the operator keyboard creating a warm airflow through and over the keys. In another embodiment, the air is directed downward at the feet of the operator. In a still further embodiment, heated air is selectively directed at either the keyboard or downward.

1 Claim, 4 Drawing Sheets

HEATED WORKSTATION

BACKGROUND OF THE INVENTION

This invention relates to a data processing system workstation, and, more particularly, to a workstation which is climatized by selectively utilizing the heat generated during system operation to produce controlled amounts of heat within selected areas of the workstation, such as the keyboard.

Data processor operators typically spend considerable periods of time each day seated at terminals entering data and other functions via a keyboard and a mouse while viewing a monitor screen. Some locations may be inadequately heated during cold months or have excessive air conditioning applied during hot months. For either case, the efficiency of the operator may be impaired due to physical discomfort. As is well known, a person's extremities are the most sensitive to temperature extremes and, especially with cold, slightly numb fingers and toes create a physical discomfort that may be translated into errors such as typing errors created by numb fingers.

The present invention is directed towards a means for providing warmth to an operator's extremities by selectively channeling some of the heat generated by the data processing system into and around the keyboard or downward onto the location normally occupied by an operator's feet. The heat is typically generated within the main processor which, houses, the circuit boards and power supplies associated with computer and data processing functions. Excess heat is conventionally vented through an opening in the machine via a cooling fan. The amount of heat generated in this manner is not insignificant. For example, a Xerox 6085 (1186) workstation dissipates between 1058 and 1871 BTU/hr., depending on configuration. Recent measurement of a typical 6085 operating in an ambient temperature of 75 degrees F., showed a processor exhaust air temperature of 91 degrees. A Sun SPARC Station-I was measured at 89 degrees. Rather than allow the heat to be wasted, the present invention discloses a system that exhausts air from the main processor into selected areas of the operator workstation. More particularly, the present invention is directed towards a data processing system including, in combination, a main processor incorporating means within the processor housing to vent air heated during operation, an operator workstation for entering and viewing data transferred between said processor and said workstation, and air coupling means connected between said processor and said workstation to conduct, vented heated air into selected areas of said workstation.

DESCRIPTION OF THE INVENTION

Figure 1:
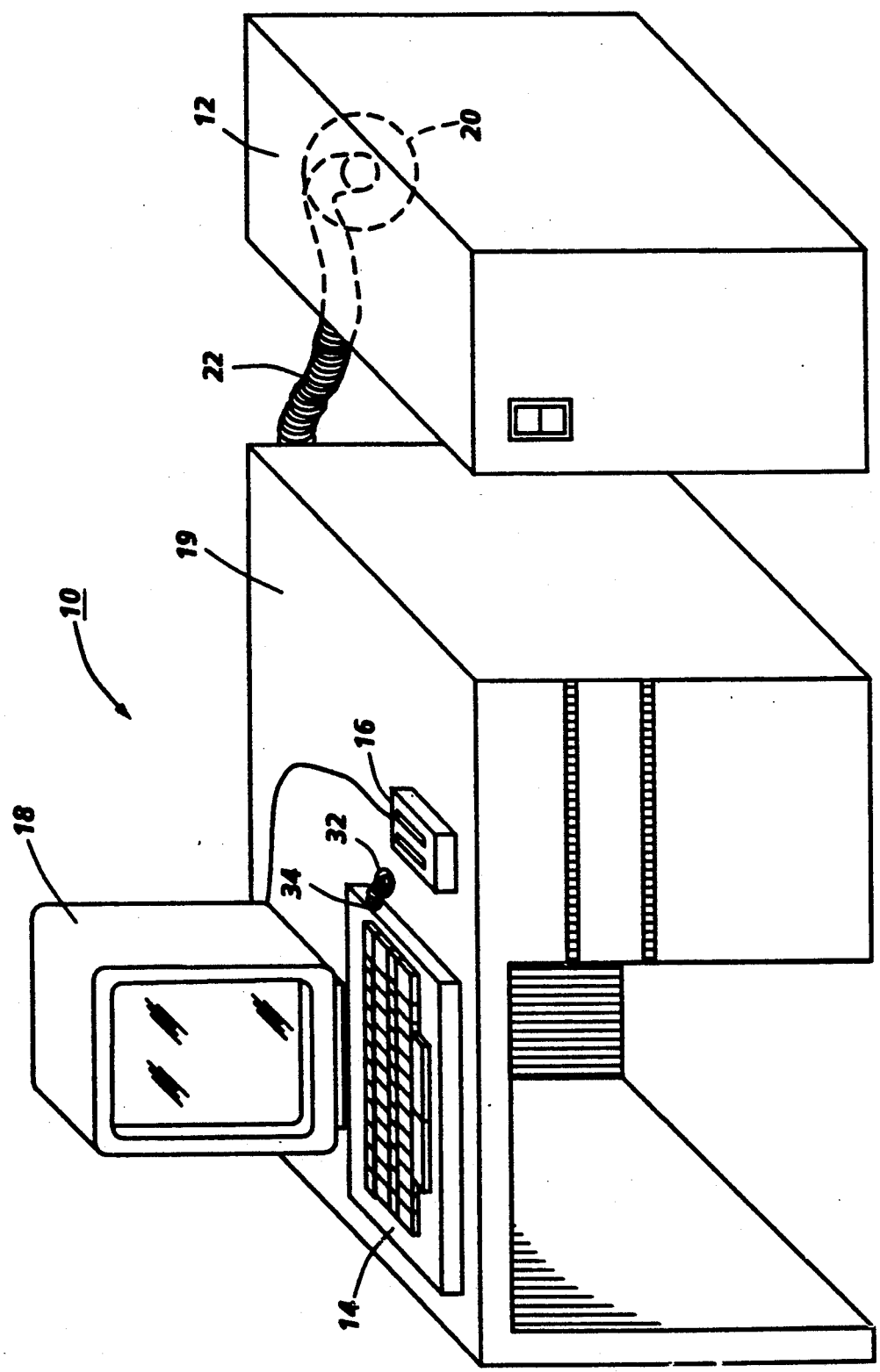
FIG. 1 shows the main components of a data processing system adapted to provide a heating conduit from the main processor to the operator workstation.

Referring now to FIG. 1, there is shown a conventional data processing system 10 which has been modified according to the principles of the present invention. The system includes a main processor 12, a keyboard 14, mouse 16 and display monitor 18, all supported on table 19. Not shown, but optionally included in other systems are disk drives, printers and other peripherals. Information is transferred to and from main processor and the peripheral devices by conventional controller and data buses. It is understood that the main processor is meant to include any device which has the previously mentioned components and may, in certain systems be referred to as a central processing unit (CPU) or simply a computer.

As mentioned previously, processor 12 generates heat during system operation; excessive heat is conveniently vented through an opening in the back of processor 12 via a cooling fan 20.

Figure 2:
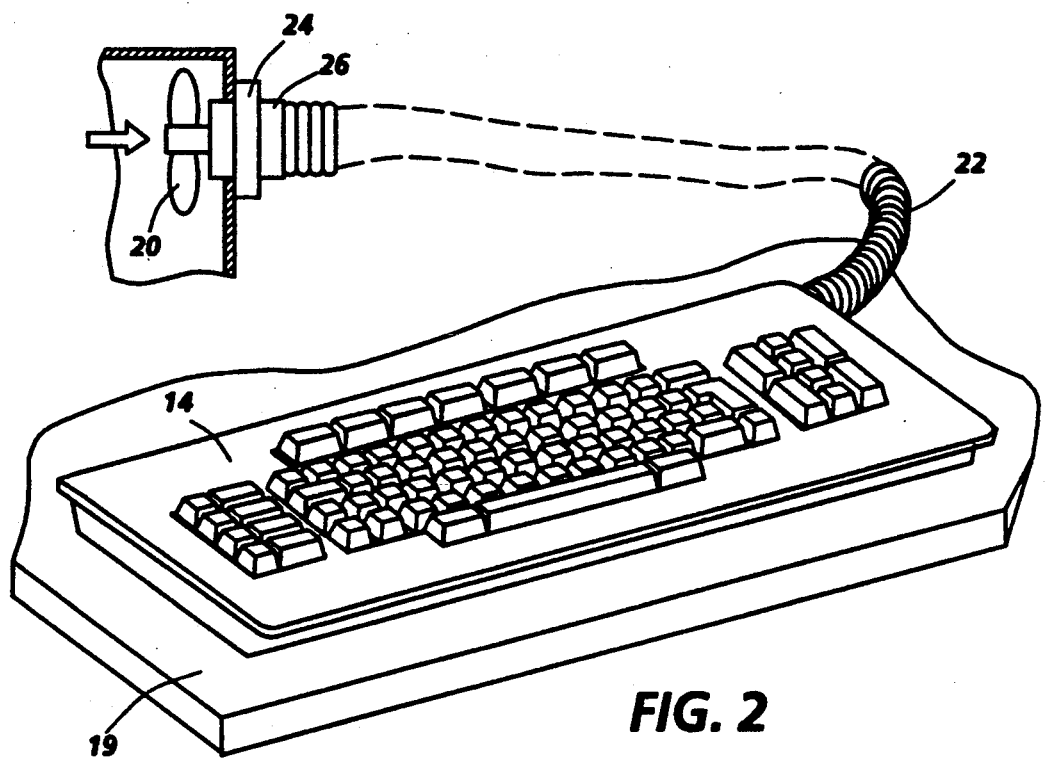
FIG. 2 shows in detail a heat duct coupling between the main processor and an operator keyboard.

According to the present invention, and referring to FIGS. 1 and 2, an air coupling, which in a preferred embodiment is a 2 inch thinwall flexible vinyl tubing member 22, is connected between the cooling fan outlet and the keyboard. As shown in FIG. 2, a mounting flange 24 is mounted over the normally opened vent aperture in processor 12 housing. Coupling 26 is a square or rectangular flange which matches the cooling fan outlet. One end of tubing member 22 is connected to coupling 26 with the other end of the tubing running directly to the keyboard. In the preferred embodiment, a hole 32 of appropriate diameter is drilled through table 19 and through hole 34 in the side right edge of keyboard 14. The keyboard end of the tubing is attached to the keyboard via a press-on fitting (not shown) over hole 34.

Figure 3:
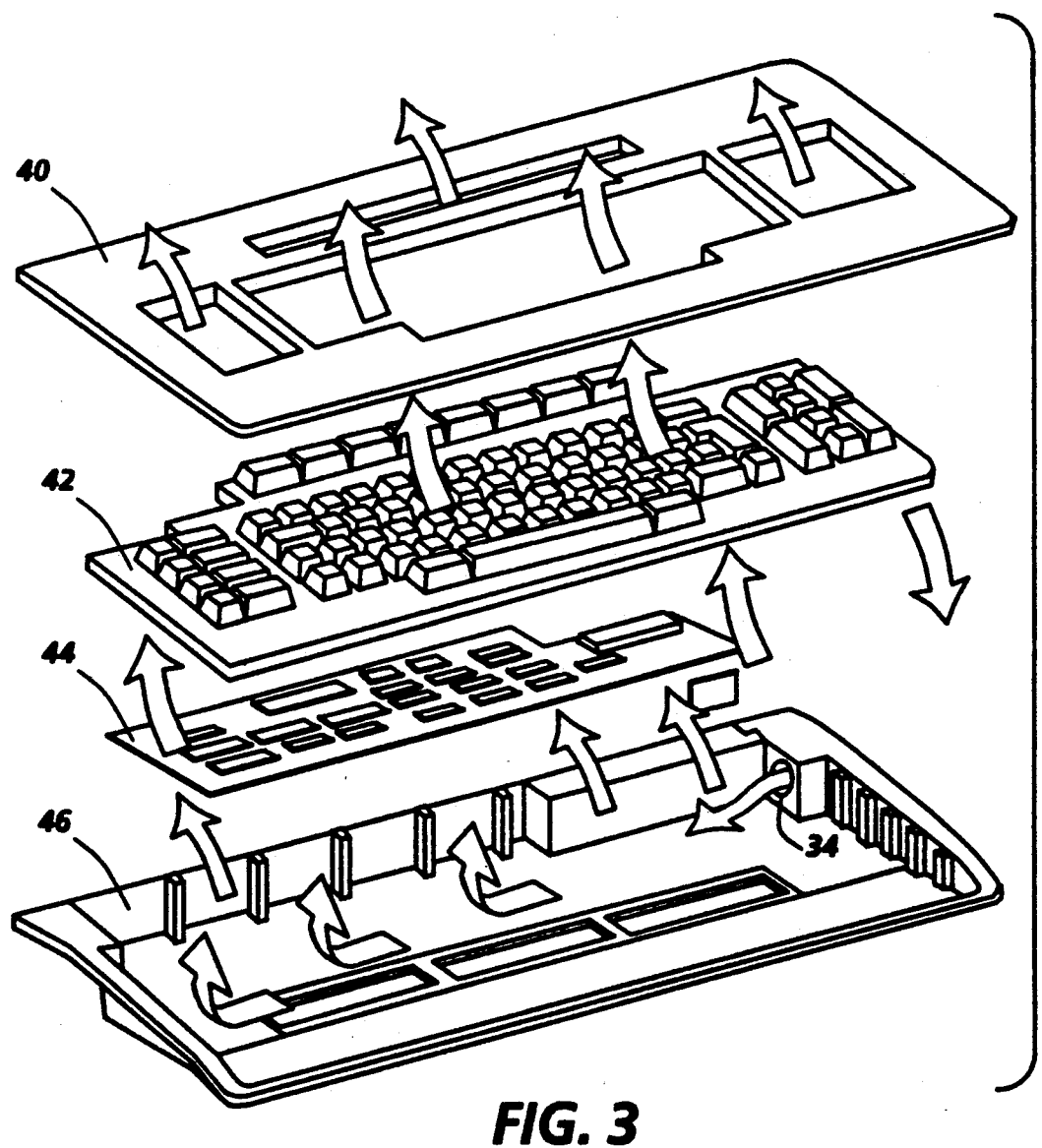
FIG. 3 shows a heated air flow pattern in an exploded view of the keyboard.

FIG. 3 shows an exploded view of keyboard 14. Keyboard 14 comprises a cover plate 40, key switch plate 42, printed circuit board 44 and bottom case 46. The volume occupied by the circuit board 40 and switch plate 42 are relatively small compared to the total volume available; hence the keyboard acts in the nature of a plenum helping to distribute the air evenly and reduce its velocity. Keyboard 14, like nearly all computer keyboards save for the flat membrane types, has small gaps or interstices between each of the keys. Thus, heated air introduced into case 46 via tubing member 22 will establish circulation patterns along the bottom of case 46 and upward through the space between the keys. Thus, the air would warm the fingers of an operator as well as the keys themselves, substantially reducing the discomfort otherwise experienced by an operator in the unfavorable climate conditions described previously.

Figure 4:
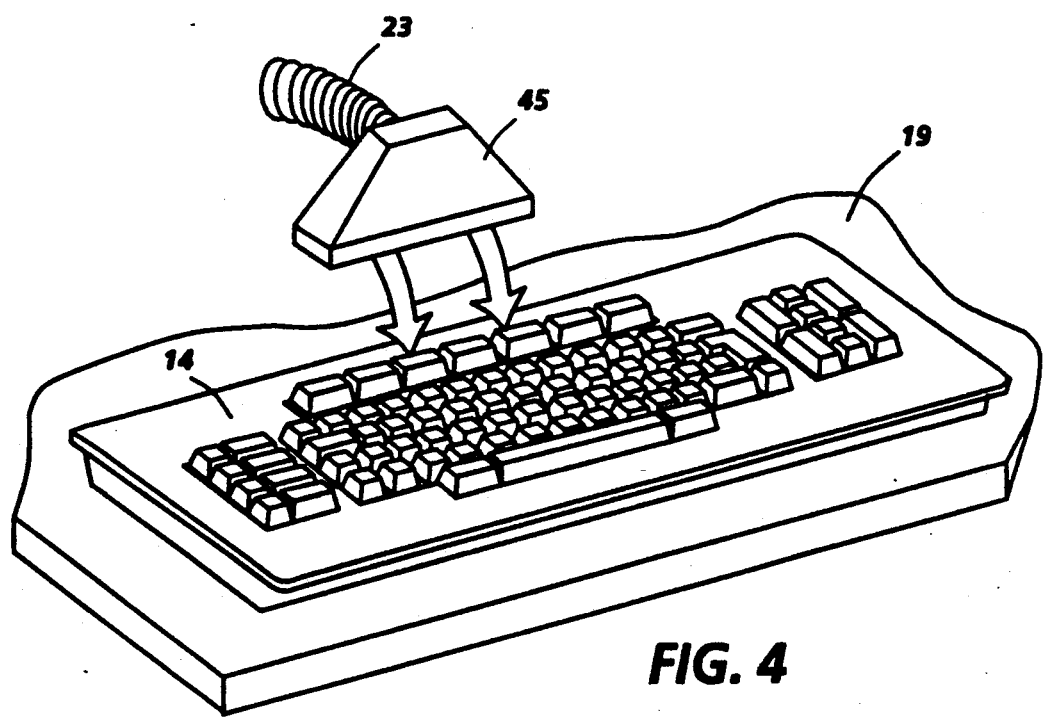
FIG. 4 shows an alternate embodiment of the invention wherein the heated air is distributed over the surface of the keyboard.

An alternate embodiment of the invention is to terminate the keyboard end of the tubing in a wide nozzle 45, as shown in FIG. 4, and either tape or clamp the tubing at some desired point outside and above the keyboard. The nozzle will be positioned so as to direct the air flow over the surface of the keyboard. This embodiment has the advantage of not requiring modification of the keyboard, and also being usable with flat membrane keyboards, but may not present as effective an air flow to all of the keys on the embodiment.

Figure 5:
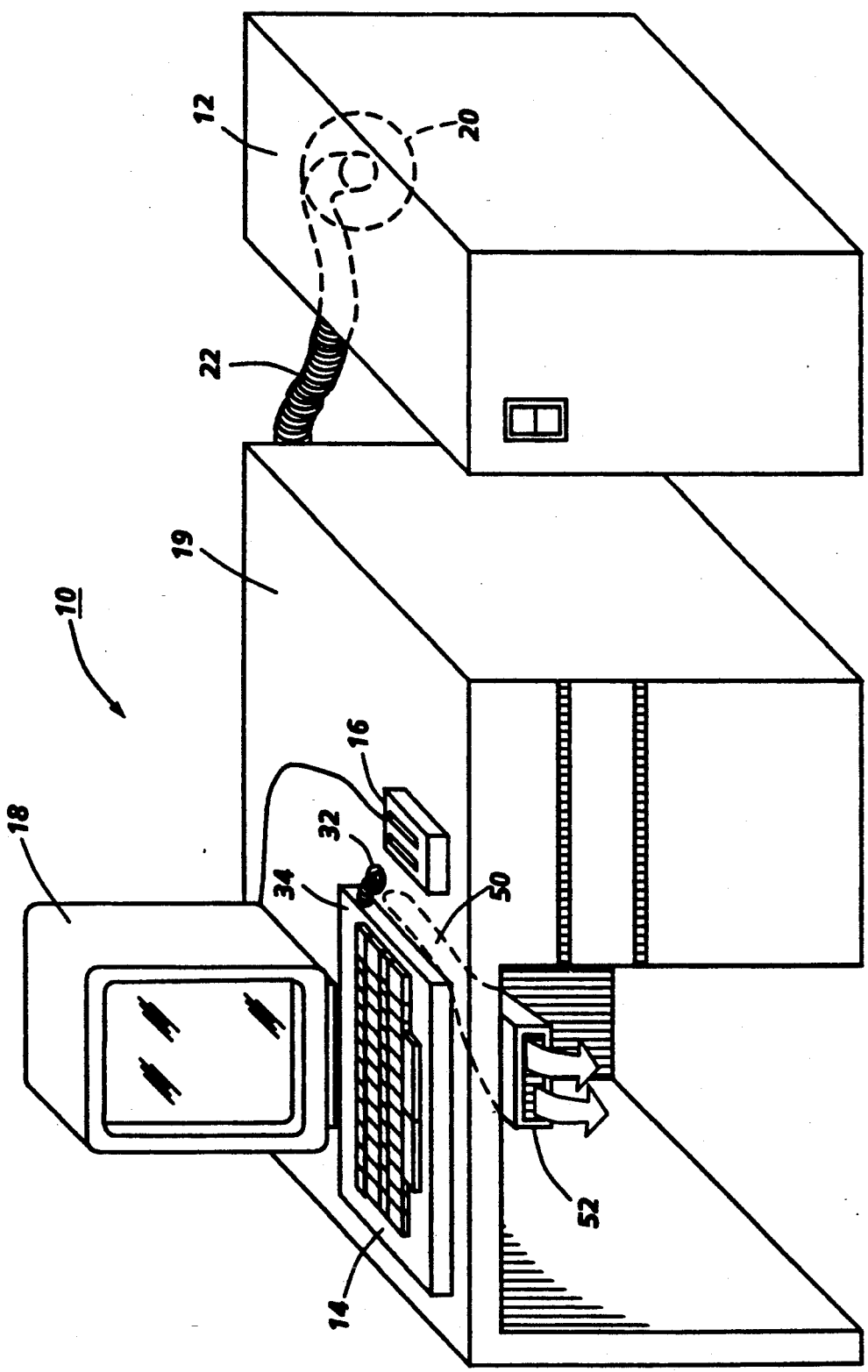
FIG. 5 shows a still further alternate embodiment of the invention where the heated air is directed towards the area which would be occupied by the operator's feet.

A still further embodiment of the invention is shown in FIG. 5. FIG. 5 shows the modified workstation of FIG. 1 with a extension tubing 50 coupled to tube 22 at a convenient juncture. Nozzle 52 is attached to the end of tubing extremity 50 and attached to the bottom of table 19. Tubing extension 50 can be switched in by an operator to direct the warm airflow downward against the feet of the operator, thus providing a still further measure of comfort.

An added benefit when using the FIG. 2 embodiment is that the keyboard is kept free of potentially harmful airborne contaminates, such as dust, since these contaminants would be expelled through the key interstices into the ambient and further contaminants prevented from settling. Another benefit which is available with any of these embodiments is that the cooling fan noise, which can be appreciable for some systems, is reduced since the tubing would act as a muffler. A still further advantage may be enabled by adding a filter at the fan outlet to reduce the introduction of dust and other airborne contaminates into the keyboard.

It is understood that all of the above embodiments can be enabled under conditions where an operator experiences discomfort and wishes to alleviate same. When a workstation warming is not required, coupling 26 is simply disconnected, or an air diverting valve enabled, and the heated air from the interior of CPU 10 is vented into the ambient. Additional modification may be required for some systems. For example, if the air flow through the processor becomes too restricted, a larger capacity fan or small booster fan may be required to provide a stronger air flow.

While the invention has been described with reference to the structure disclosed, it will be appreciated that numerous changes and modifications are likely to occur to those skilled in the art, and it is intended to cover all changes and modifications which fall within the true spirit and scope of the invention.

I claim:

1. A data processing system including, in combination:
   a main processor incorporating means within the processor housing to vent air heated during operation,
   an operator workstation for entering and viewing data transferred between said processor and workstation, and
   air coupling means connected between said processor and said workstation to conduct vented, heated air into selected areas of said workstation, wherein said workstation includes a keyboard for entering data and wherein said coupling means introduces said vented, heated air into the interior of said keyboard, whereby the heated air circulates between and over said keys providing warmth to the fingers of an operator manipulating said keys.

* * * * *